United States Patent
Lu

(10) Patent No.: US 8,020,099 B1
(45) Date of Patent: Sep. 13, 2011

(54) METHODS AND APPARATUS OF SETTING UP INTERACTIVE SESSION OF GRAPHICAL INTERACTIVE APPLICATION BASED ON VIDEO

(75) Inventor: Yang Lu, Windsor (CA)

(73) Assignee: ViTie Inc.

( * ) Notice: Subject to any disclaimer, the term of this patent is extended or adjusted under 35 U.S.C. 154(b) by 777 days.

(21) Appl. No.: 12/030,195

(22) Filed: Feb. 12, 2008

Related U.S. Application Data

(60) Provisional application No. 60/889,741, filed on Feb. 13, 2007.

(51) Int. Cl.
*G06F 3/048* (2006.01)
(52) U.S. Cl. ............................ 715/720; 700/88; 717/106
(58) Field of Classification Search .................... 715/720
See application file for complete search history.

(56) References Cited

U.S. PATENT DOCUMENTS

2004/0261026 A1 * 12/2004 Corson .......................... 715/704

* cited by examiner

*Primary Examiner* — Tuyetlien Tran
*Assistant Examiner* — Peiyong Weng

(57) ABSTRACT

This invention presents systems and methods for supporting creation of interactive session of a graphical interactive application based on video. It comprises a server system that associates video with graphical interactive application contexts wherein the video can be retrieved or queried by a client. It allows user of a client to create interactive session of a graphical interactive application corresponding to the associated video. Graphical interactive application context comes from previous executed interactive session and comprises saved graphical interactive application state. User can replay a saved graphical interactive application session at the start or end or any pre-defined frame moment of the associated video. The context can be downloaded to a client and the client can create the corresponding graphical interactive application session.

15 Claims, 9 Drawing Sheets

METHODS AND APPARATUS OF SETTING UP INTERACTIVE SESSION OF GRAPHICAL INTERACTIVE APPLICATION BASED ON VIDEO

This application claims the benefit of U.S. Provisional Application No. 60/889,741, filed on Feb. 13, 2007.

BACKGROUND OF THE INVENTION

Field of the Invention

This invention relates to association of creating of interactive session of graphical interactive application based on video service provided by a host system.

BRIEF DESCRIPTION OF THE DRAWINGS

The invention may be better understood, and further advantages and uses thereof more readily apparent, when considered in view of the following detailed description of exemplary embodiments and examples, taken with the accompanying diagrams, in which.

Figure 1:
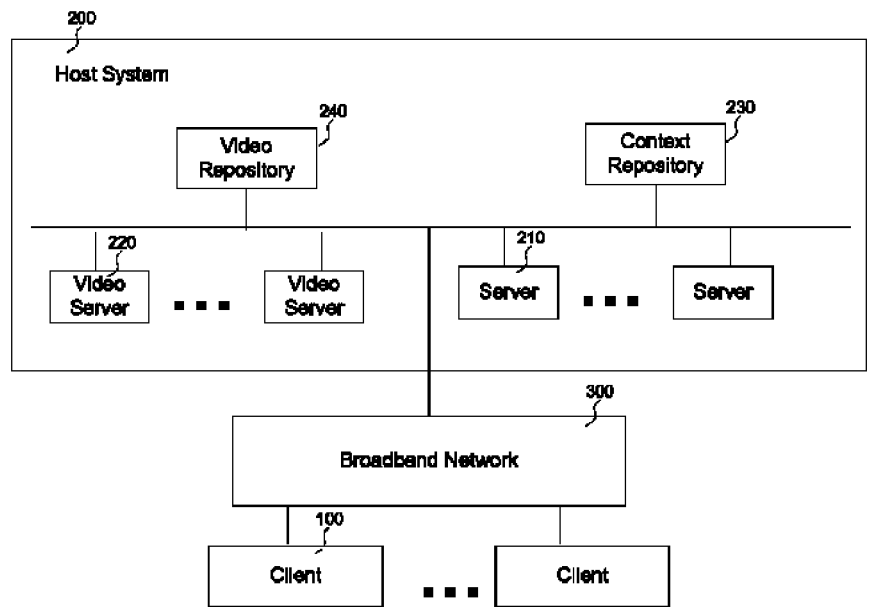
FIG. 1 is a block diagram showing, in one exemplary embodiment, an exemplary host system and clients.

While the patent invention shall now be described with reference to the embodiments shown in the drawings, it should be understood that the intention is not to limit the invention only to the particular embodiments shown but rather to cover alterations, modifications and equivalent arrangements possible within the scope of appended claims. Throughout this discussion that follows, it should be understood that the terms are used in the functional sense and not exclusively with reference to specific implementation.

DETAILED DESCRIPTION OF THE PREFERRED EMBODIMENTS

Discussion in this section is intended to provide a brief description of some exemplary embodiments of the present invention.

FIG. 1 is a block diagram showing, in one exemplary embodiment of the present invention, the system involved for connecting multiple clients (100) with a host system (200) over broadband network (300) (e.g., broadband Internet, IPTV network, mobile broadband network (e.g., 2.5G network, 3G network, 4G network, etc.), wireless network, data service over cable, video-on-demand cable network, DSL, etc.).

In one embodiment, a host system (200) can comprise one or multiple servers (210) that respond to one or multiple requests from the clients (100). In one embodiment, the server (210) can act as web/online portal, or web server or gateway.

Further, in an embodiment, a host system can comprise one or multiple video servers (220). A video server (220) can provide media download or streaming services (e.g., video streaming, video download, video-on-demand, etc.) to the clients (100).

A host system (200) can comprise one or multiple video repositories (240) that store a collection of video or media contents (e.g., video clip, image sequence, screen shoots, etc.). A video server (220) can access video or media contents stored in the video repository, deliver the contents to one or multiple clients (100) (e.g., download, stream).

In addition to conventional media or video contents such as natural video or staged show, a video repository can contain video or media contents generated from or based on graphical interactive application (e.g., computer game, console game, mobile game, video game, interactive graphical application, graphical virtual world, graphical navigation system, interactive media, etc.).

Examples of such video or media contents include but not limited to, captured graphical interactive application video such as captured game play video, in-game video (e.g., introduction movie, cut-through video, in-game movie, etc.), synthesized media or video contents based on graphical interactive application artifacts (e.g., video based on artifact such as graphical interactive application scene, game character, storyline, props, etc.).

Further, in an embodiment, a host system (200) can comprise one or multiple context repositories (230). In accordance with the present invention, in an embodiment, a client can create an interactive session of a graphical interactive application corresponding to the video content retrieved from a host system, wherein the interactive session is related to the video content.

For example, a video downloaded from a host system can be video of recorded graphical interactive application or video of a replay session of a graphical interactive application based on certain level, map, episode, mod, setup, state, or configuration of the graphical interactive application. After or during viewing of the video, user of a client can start to play the graphical interactive application by creating an interactive session corresponding to the recorded or replay session of the graphical interactive application.

For instance, in an embodiment, user of a client can create an interactive session based on context of the recorded or replay session whose video has been delivered to the client or viewed by the user. This includes but not limited to, creating an interactive session that uses the same level, or the same map, or the same episode, or the same mod, or the same setup, or the same state, or the same configuration as the recorded or replay session shown in the video.

In an embodiment, video or media content delivered to a client can serve as introduction material to user of the client. If the user is interested in playing the graphical interactive application using the context (e.g, level, map, state, mod, configuration, setup, etc.) of the recorded or replay session whose video has been displayed by the client, the user can thereafter create an interactive session corresponding to the video using context of the recorded or replay session.

Exemplary use cases include but not limited to, playing the same graphical interactive application (e.g., computer game, console game, mobile game, video game, etc.) using the same context as someone else has played before (defined as "play my game" use case when the graphical interactive application is a game), or a graphical interactive application session with context as set forth in the video (defined as "continue my game" use case when the graphical interactive application is a game), etc.

In addition, there can be one or a collection of contexts associated with a piece of video content. For instance, in one embodiment, for a recorded or replay session whose video is displayed by a client, there can be a context for every frame of the video. In this case, a client can create an interactive session starting from any frame moment.

Alternatively, there can be contexts associated with a collection of sampled or pre-defined frame moments instead of every frame. Further, there can be context defined at the first frame that allows user to replay a session from the beginning, or context defined after the last frame that allows user to continue a session.

It should be understood that the user who accesses a video of a graphical interactive application and creates an interactive session accordingly using a context of the graphical interactive application can be the same as or different from the user who creates the context or video. For instance, in an embodiment, user A can play a graphical interactive application session, capture the video, and save the context(s) in a host system. Later, user B can access the video. If user B is interested in playing the graphical interactive application, user B can play the same graphical interactive application by creating an interactive session using the context saved by user A.

In an embodiment, a host system (200) can use a context repository (230) to store context data of a graphical interactive application session. Such context includes but not limited to, graphical interactive application setup, graphical interactive application configuration, modifications to graphical interactive application (mods), graphical interactive application level data or setup, graphical interactive application map or setup, graphical interactive application episode, saved graphical interactive application context, checkpointed graphical interactive application state, saved graphical interactive application state, etc.

In an embodiment, when requested, a host system (200) can create an interactive session of a graphical interactive application (interactive session) at host system side or client side based on context information retrieved from a context repository (230).

In one embodiment, when an interactive session is created on a host system (200), the host system (200) can use its resources to execute the graphical interactive application for the client. In an additional embodiment, media command or media data corresponding to execution of the graphical interactive application can be transmitted to the client and the client can render visual-audio output of the graphical interactive application accordingly.

Media command of a graphical interactive application includes but not limited to, API (application programming interface) call, media library call (e.g., graphics library such as DirectX call, OpenGL call, audio library such as DirectSound call, OpenAL call, middleware such as renderware API call, window system such as X-windows command, etc.), media driver command (e.g., graphics driver command, audio driver command, etc.), or any other type of media command that can be used for rendering or processing visual-audio output. Media data of a graphical interactive application includes but not limited to, texture (e.g, 1D texture, 2D texture, 3D texture, 4D texture, etc.), drawing primitive, mesh, geometry data, vertex object, vertex buffer, vertex attribute, shader, parametric surface, animation sequence, articulated figure, key framed data, audio data, speech, voice, etc.

Still referring to interactive session created on a host system side, in another embodiment, a host system (200) can render visual-audio output of an interactive session. The visual-audio output can be encoded into media (e.g., compressed frame stream, video stream), and delivered (e.g., stream, download) to a client (100).

A host system (200) can use any media compression or encoding technique or standard (e.g., H.263, H.264, H.265, any version of MPEG, WMA, etc.) to encode the rendered visual-audio output.

Furthermore, in an embodiment, visual-audio output can be rendered on memory buffer (e.g., virtual frame buffer, virtual audio buffer, video or audio memory surface, off-screen frame buffer, etc.) by a graphics or audio rendering apparatus. The rendered visual or audio contents stored in said memory buffer(s) can be transmitted to apparatus that can encode the contents into streaming media.

Alternatively, said encoding apparatus (e.g., encoding hardware, or encoding software) can be integrated with graphics or audio rendering apparatus.

In an additional embodiment, integrated encoding apparatus or software can access the memory buffer(s) where the rendered visual or audio contents are stored, and encode the contents into streaming media.

In an alternative embodiment, a host system (200) can deliver session context required for creating an interactive session to a requesting client (100). Based on the context, the client (100) can start a local interactive session by locally running the graphical interactive application with the context.

Figure 2:
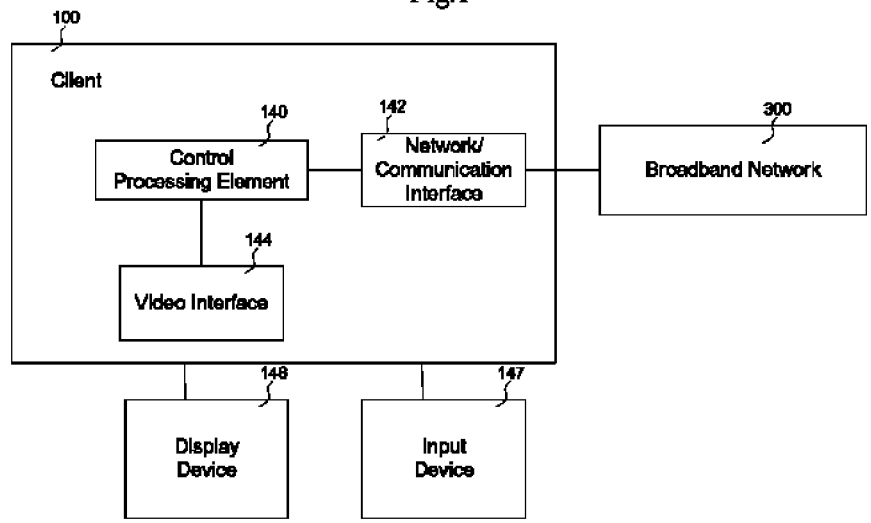
FIG. 2 is a block diagram showing, in one exemplary embodiment, components of a client.

FIG. 2 is a block diagram showing, in one exemplary embodiment of the present invention, components of a client. Examples of client (100) include but not limited to, set-top box, personal computer, console, mobile device (e.g., PDA or cellphone, etc.), media player, portable media player, or other visual-audio computing device. A client (100) can comprise one or multiple network/communication interfaces (142) (e.g., WiFi, WiMax, cellula, ethernet, Gigbit ethernet, cable, DSL, etc.).

In addition, a client (100) can comprise one or multiple control processing elements (140) (e.g., micro processor, DSP, embedded processor, programmable logic device, etc.). Said control processing element can be either standalone or integrated with other components.

In addition, one or multiple display devices (146) (e.g., television set, HDTV, CRT monitor, LCD panel, TFT screen, etc.) can be connected with or integrated with a client (100) via video interface (144).

In one embodiment, when a host system transmits media stream (e.g, recorded video, video of a replay session of a graphical interactive application, video of an interactive session of a graphical interactive application, etc.) to a client (100) over broadband network (300), the client (100) can decode the received media stream, display the results on one or multiple integrated or connected display devices (146).

In another embodiment, when a host system transmits media command and/or media data of a graphical interactive application session (e.g., replay session, interactive session, etc.) to a client (100), the client (100) can render the corresponding visual-audio output according to the received media command and/or media data, and display the rendered visual-audio output.

In another alternative embodiment, when a host system transmits graphical interactive application context to a client (100), the client can create a local interactive session according to the context, execute the graphical interactive application, render visual-audio output of the session locally, and display the rendered results.

For interaction, a client can comprise one or multiple input devices (147) (e.g., game pad, video game controller, keyboard, remote controller, joystick, touch screen device, mouse, wireless mouse, etc.). Optionally, a mobile device itself (e.g., cellphone, PDA, etc.) can be used as an input device.

An input device can connect to a client (100) via wired (e.g., cable, USB, serial link, ethernet, fireware, etc.) or wireless connection (e.g., infrad, bluetooth, WiFi, etc.).

In embodiments where an interactive session is executed by a host system, a client (100) can transmit user's input to the host system. The host system can route the user input to the corresponding executed interactive session of graphical interactive application.

In an embodiment, a client can first process user input (e.g., user input translation, user input mapping, user input encoding, user input interpretation, etc.) and then transmit processed user input to a host system.

Figure 3:
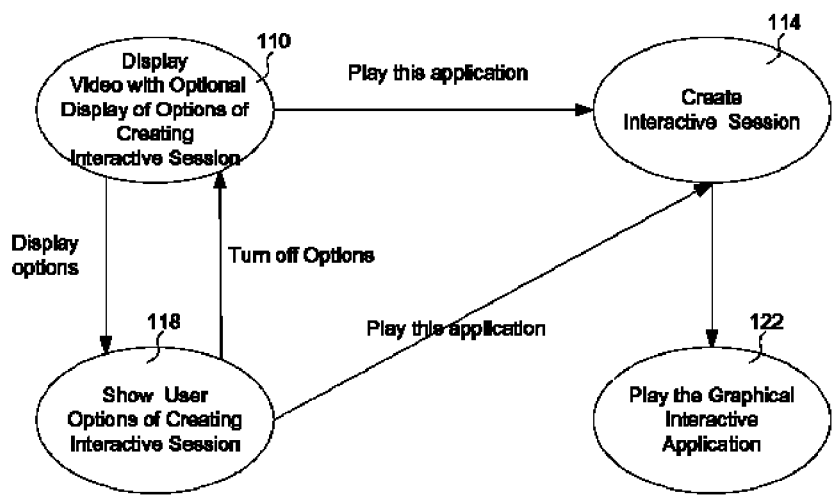
FIG. 3 is a state transition diagram showing, in one exemplary embodiment, state transition from video display to interactive session creation.

FIG. 3 is a state transition diagram showing, in one exemplary embodiment of the present invention, state transition from viewing video to creating an interactive session (114).

A client can retrieve video information from a host system and display the corresponding video on the screen of its display device (110). In a further embodiment, user of the client can view the video, pause the video, replay the video, forward/backward the video, or perform any conventional video play action.

In an embodiment, the video played by a client can be streamed or down-loaded from a host system.

In another category of embodiments, video displayed by a client can be generated in real time by replaying a graphical interactive application session. The replay session can be carried out by either a client or a host system. A host system can store graphical interactive application replay context in one or multiple context repositories. Replay context of a graphical interactive application is a particular type of graphical interactive application context. A graphical interactive application replay context allows replay of a graphical interactive application session without user input.

In an embodiment, a graphical interactive application replay context comprises recorded or captured user interaction data such as user input or logged state change that can be used for replaying a graphical interactive application session.

Still referring to video viewing state (110), in an embodiment, a host system can retrieve a replay context and deliver the context to a requesting client. The client can replay the graphical interactive application session based on the received replay context and render its visual-audio output locally.

In another embodiment, upon request of a client, a host system can create a replay session based on a replay context. Further, the host system can send media command and/or media data of the replay session to the client and have the visual-audio output rendered by the client.

In anther embodiment, a host system can render visual-audio output of a replay session, encode the rendered visual-audio output, and deliver the encoded results (e.g., download, streaming) to the client.

In accordance with the present invention, in an embodiment, during video viewing, or after the end of a video is reached, a client can display on the screen option(s) (118) that allows user to start an interactive session of the graphical interactive application corresponding to the played video. Different from a replay session of a graphical interactive application, an interactive session is playable and allows user interaction. If the user decides to play the related graphical interactive application (122) either at the end of, or in the middle of, or at the beginning of video play, an interactive session can be created remotely by the host system or locally by the client based on graphical interactive application context corresponding to the played video (110). A host system can retrieve the related context from one or multiple context repositories, and deliver the context to the client if the client requests to start an interactive session locally.

Alternatively, if an interactive session of a graphical interactive application is created by a host system, the host system can retrieve the graphical interactive application context and create an interactive session. In this case, user input from the client can be transmitted to the host system and routed to the interactive session. The interactive session can transmit media command and/or media data to the client where the client can render the visual-audio output accordingly. Or in an alternative embodiment, the host system can render the visual-audio output, encode the visual-audio output, and deliver the encoded visual-audio output to the client.

In an embodiment, displayed video can be paired with at least one graphical interactive application context that can be used to create an interactive session of a graphical interactive application (114). In one scenario, interactive session can correspond to the beginning of the displayed video (e.g., "play my game" when the application is a game).

In another scenario, interactive session can continue from the end of the displayed video (e.g., "continue my game"

when the application is a game). Alternatively, an interactive session can start from any frame moment of the displayed video.

In an embodiment where a client displays video based on replay context, if user of the client wants to play an interactive session, the client can convert a replay session into an interactive session (e.g., replacing logged or replayed input with user input, using state change induced by user input instead of logged state change, etc.).

In another embodiment where a client receives video from a host system that renders the video based on replay session or transmits media command and/or media data to the client based on replay session, when user of the client requests to play the graphical interactive application session, the host system can convert the replay session of the graphical interactive application into an interactive session by routing user input from the client to the replay session and replacing the logged or replayed input with input received from the client.

Figure 4:
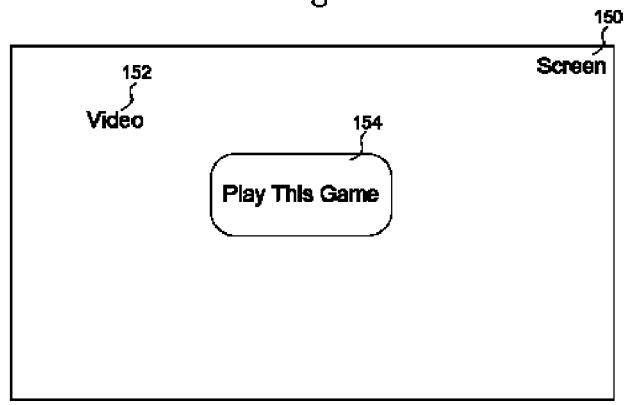
FIG. 4 is a sketch interface showing, in one exemplary embodiment, display of option for creating interactive session from video.

FIG. 4 is a sketch interface showing, in one exemplary embodiment of the present invention, exemplary client display that allows user to choose playing a graphical interactive application session referenced by a video (152).

In accordance with the present invention, a client can use a variety of different embodiments on how to display the options that allow user of a client to start an interactive session related to a displayed video (152). In an embodiment, displayed user option includes but not limited to, option to start an interactive session from the beginning (e.g., "play my game", etc.), option to continue a graphical interactive application from the end of the video (e.g., "continue my game", etc.), option to play a graphical interactive application from a frame moment of the video, etc.

In an embodiment, a client can display the option(s) as one or multiple user interaction items. Such user interaction items include but not limited to, button, dialog window, menu item, widget, or other type of user interface item (154).

Regarding to when the option(s) is displayed, in one embodiment, the option(s) to start an interactive session can be displayed at the beginning before a video is being played or shown to the user. Alternatively, the option(s) can be displayed when a video is played. Or the option(s) can be displayed at the end after a video is played.

Regarding to where the option(s) is displayed, in one embodiment, user interaction item(s) of the option(s) can be overlayed (e.g., overlay, blending, etc.) over the displayed video frame (e.g., at the beginning, or during, or at the end of video play, etc.).

In an alternative embodiment, user interaction item(s) of the option(s) can be displayed on any screen region (150) outside the displayed video frame. Such outside screen region includes but not limited to, toolbar, menu bar, side panel, etc.

Further, in an embodiment, the screen comprising the user interaction item(s) and video display can occupy the full screen of a display device, or occupy part of the screen of a display device, or occupy a Windowed screen region.

FIG. 4 shows one exemplary layout that shows the option of creating an interactive session as button (154) overlayed on top of a displayed video (152).

Figure 5:
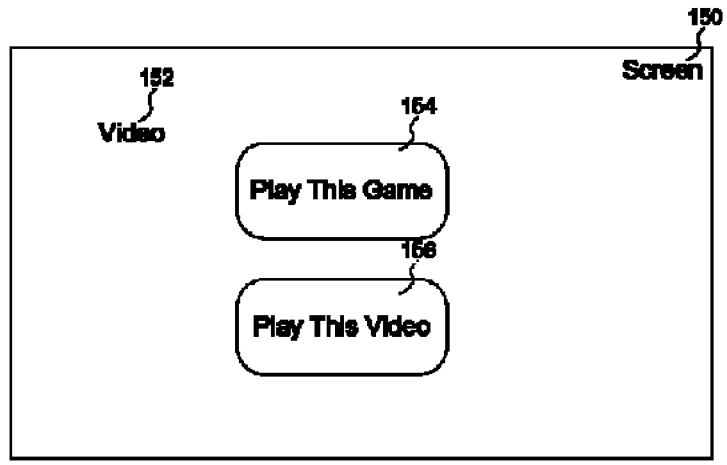
FIG. 5 is a sketch interface showing, in one exemplary embodiment, display of option for creating playable interactive session from video and option of playing the video.

FIG. 5 is a sketch interface showing, in another exemplary embodiment of the present invention, exemplary client display that allows user to create an interactive session or play the video (152). A client can display both options to start an interactive session (154) or option to play/replay the video itself (156).

FIG. 5 shows one exemplary layout that shows both options of creating an interactive session and playing the video as buttons overlayed on top of a displayed video (152) on screen region (150).

Figure 6:
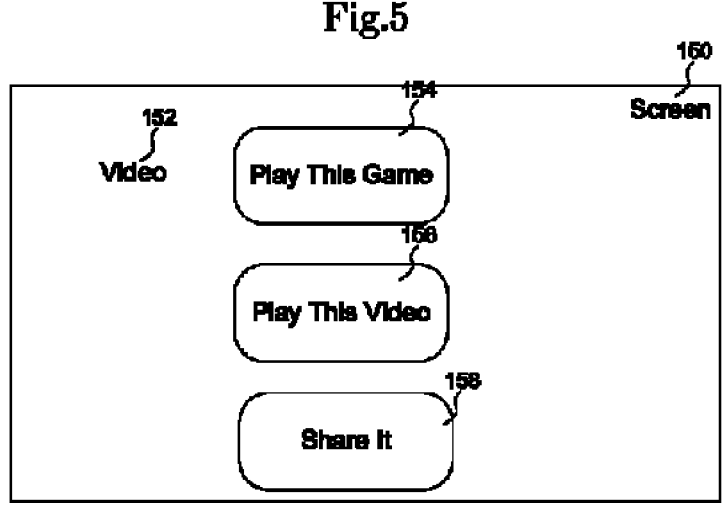
FIG. 6 is a sketch interface showing, in one exemplary embodiment, display of option for creating interactive session from video and options of playing the video and sharing the video.

FIG. 6 is a sketch interface showing, in another exemplary embodiment of the present invention, exemplary client display that allows user to create an interactive session, play the video, or share the video. A client can display both options to start an interactive session (154), option to play/replay the video itself (156), and option to share the video (158).

FIG. 6 shows one exemplary layout that shows the options of creating an interactive session (154), play the video (156), and share the video (158) as buttons overlayed on top of a displayed video (152) on screen region (150). By selecting the share option (158), user of the client can share the video with other user or client. The request of sharing can be transmitted using any network or communication approach including but not limited to, email, instant messaging, mobile messaging (e.g., SMS, MMS, etc.), digital invitation, etc.

Figure 7:
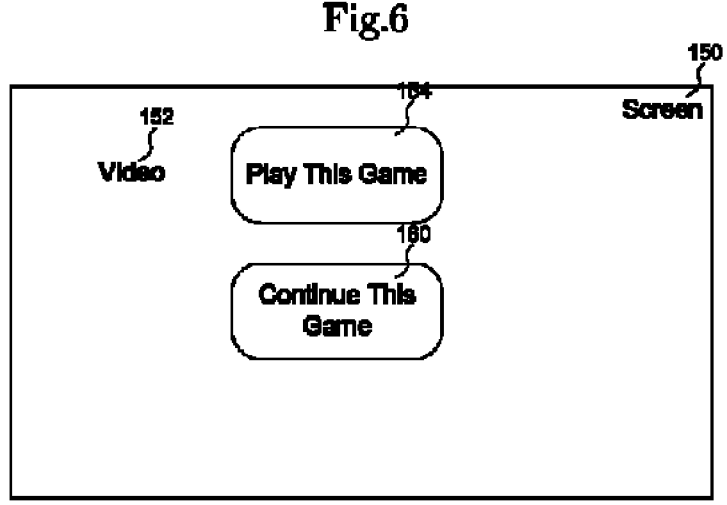
FIG. 7 is a sketch interface showing, in one exemplary embodiment, display of options for creating playable interactive session from video.

FIG. 7 is a sketch interface showing, in another exemplary embodiment of the present invention, exemplary client display that allows user to create an interactive session to continue a graphical interactive application session or play a graphical interactive application session referenced by a video (152). A client can display options to start an interactive session that continues a graphical interactive application session corresponding to a displayed video (152) (e.g., "continue my game", etc.) or option to play a graphical interactive application session (154) (e.g., "play my game", etc.).

FIG. 7 shows one exemplary layout that shows both options of playing and continuing (160) an interactive session as buttons overlayed on top of a displayed video (152) on screen region (150).

Figure 8:
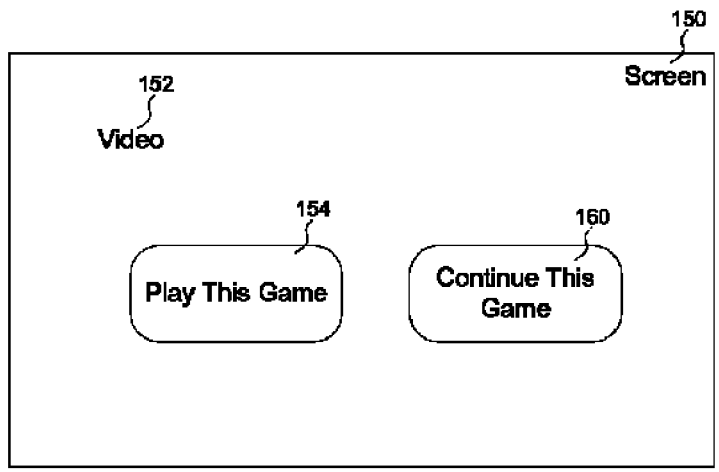
FIG. 8 is a sketch interface showing, in one exemplary embodiment, another alternative display of options for creating playable interactive session from video.

FIG. 8 is a sketch interface showing, in another exemplary embodiment of the present invention, exemplary client display that allows user to create an interactive session corresponding to a displayed video by continuing the graphical interactive application session (160) (e.g., "continue my game", etc.) or playing the graphical interactive application session (154) (e.g., "play my game", etc.). A client can display both options (160 and 154).

FIG. 8 shows another exemplary layout that shows both options of creating an interactive session (160 and 154) as buttons overlayed on top of a displayed video (152) on screen region (150).

Figure 9:
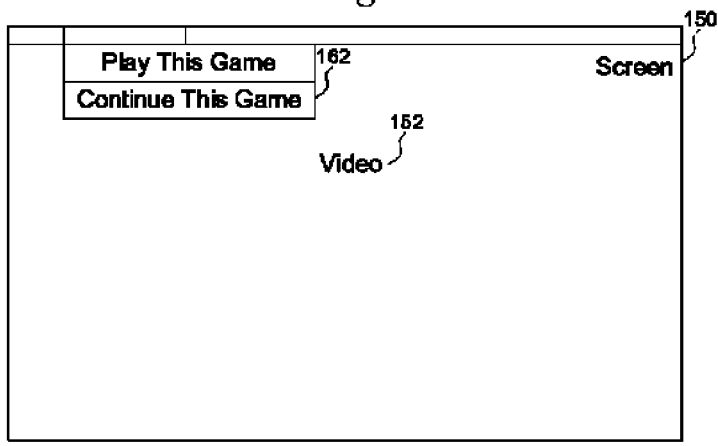
FIG. 9 is a sketch interface showing, in one exemplary embodiment, menu based user interface for creating interactive session from video.

FIG. 9 is a sketch interface showing, in another exemplary embodiment of the present invention, exemplary client display that allows user to create an interactive session corresponding to a displayed video by continuing the graphical interactive application session or playing the graphical interactive application session from the beginning.

FIG. 9 shows another exemplary layout that shows the options of creating an interactive session as menu items (162) situated on the top of a displayed video (152) on screen region (150). A client can display option to continue a graphical interactive application session or option to play a graphical interactive application session from the beginning as menu items.

Figure 10:
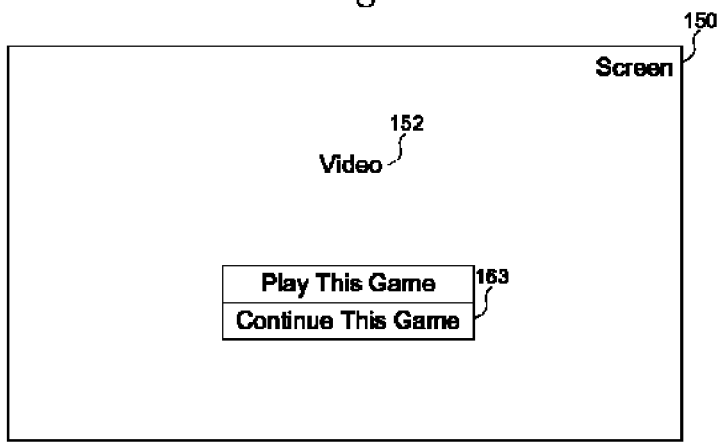
FIG. 10 is a sketch interface showing, in one exemplary embodiment, pop-up menu based user interface for creating interactive session from video.

FIG. 10 is a sketch interface showing, in another exemplary embodiment of the present invention, exemplary client display that shows pop-up menu based option(s) of allowing user to create an interactive session from video. FIG. 10 shows an exemplary layout that shows the options of creating an interactive session as pop-up menu (163) overlayed on a screen (150) comprising visual output of a displayed video (152). A client can display options to create an interactive session as menu items (e.g., continue a graphical interactive application session from the end, play an interactive session from the beginning, create an interactive session from a frame moment corresponding to a displayed video, etc.).

Figure 11:
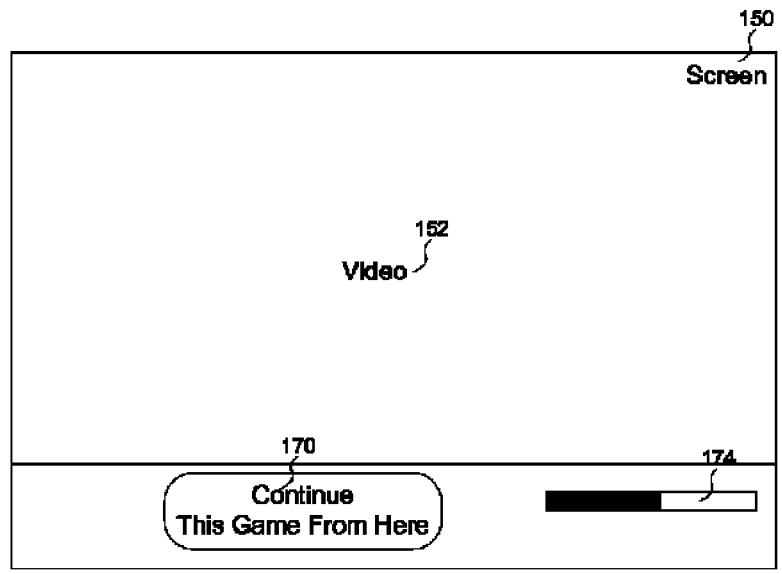
FIG. 11 is a sketch interface showing, in one exemplary embodiment, client display that enables creation of interactive session corresponding to a frame moment.

FIG. 11 is a sketch interface showing, in another exemplary embodiment of the present invention, exemplary client display that allows user to create an interactive session corresponding to context in the middle of a displayed video (152).

In one embodiment, a client can display option(s) on the screen region (150) that allows user to start an interactive session that corresponds to an arbitrary frame moment of a displayed video or corresponding to a pre-determined frame moment among a set of such moments of a displayed video (170).

In an embodiment, when a video is played, user can pause or resume the video. There can be user interaction item that allows user to pause or resume video play. Alternatively, user can pause or resume video play through shortcut key, controller button, or other similar action based on an input device. During play of a video, there can be one or multiple progress bars that show progress of the video (174). A user can decide to create an interactive session corresponding to a frame moment of the played video (152). As a result, an interactive session of the graphical interactive application can be created on the client or in a host system corresponding to the context of the frame moment.

In one embodiment, an interactive session can be created corresponding to any frame moment of a video. Alternatively, a collection of frame moments can be pre-defined as the places where interactive session can be created or started.

Figure 12:
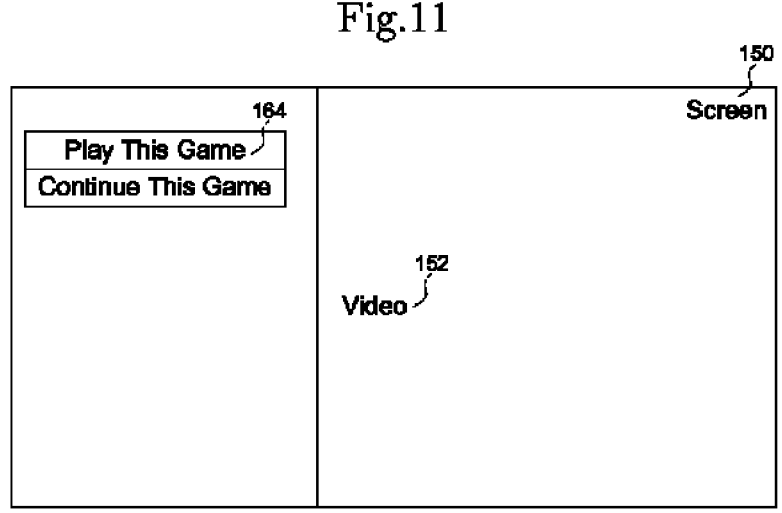
FIG. 12 is a sketch interface showing, in another exemplary embodiment, client display that embeds option of creating interactive session to displayed video.

FIG. 12 is a sketch interface showing, in another exemplary embodiment of the present invention, exemplary client display that allows user to create an interactive session corresponding to the context in the middle of a displayed video (152). In one embodiment, a client can embed option(s) (164) of creating an interactive session of a graphical interactive application associated with a displayed video on the screen comprising visual output of the displayed video (150).

In accordance with the present invention, in an embodiment, a client can embed option(s) of creating interactive session in any location of the screen that comprises visual output of a displayed video (e.g., bottom, left, right, top, center, etc.).

Figure 13:
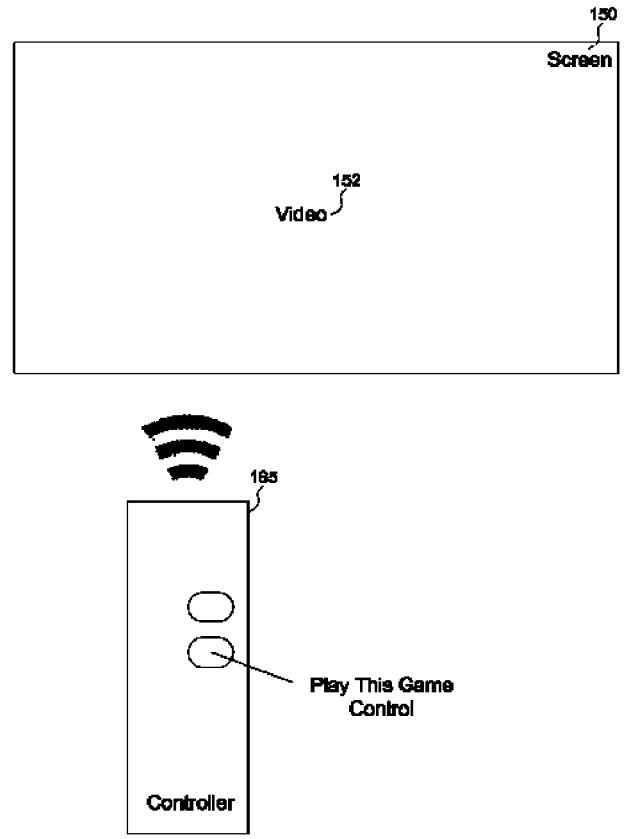
FIG. 13 is a block diagram showing, in one exemplary embodiment, controller used as interaction device to create an interactive session from video.

FIG. 13 is a block diagram showing, in one embodiment of the present invention, controller (165) used as interaction device to create an interactive session of a graphical interactive application. In accordance with the present invention, in one embodiment, when a video is displayed, user of a client can issue request to create an interactive session of the graphical interactive application associated with the displayed video (152) (e.g., "play my game", "continue my game", "play my game starting from a frame moment", etc.) showing on the screen (150) by using one of defined actions. Such defined action includes but not limited to, pressing a shortcut keyboard key, pressing a combination of keyboard keys, pressing a defined controller button, pressing a combination of controller buttons, or any other user action, etc.

Further, an embodiment can use defined input device action to invoke display of option(s) that allows user of a client to create interactive session of a graphical interactive application. For instance, in an embodiment, when a video is displayed, user of a client can take certain defined action using an input device. As a result, the client can display option(s) that allows the user to create an interactive session associated with the displayed video (152) (e.g., "play my game", "continue my game", "play my game starting from a frame moment", etc.). Similar to the scenario where option(s) can be invoked, in an embodiment, user of a client can take defined action to turn off displayed option(s) that allows user to create interactive session from displayed video.

It should be understood that the scope of the present invention is not limited to any specific input device. An embodiment may associate request of creating an interactive session with any input action of any input device.

It should be understood that FIGS. 4 to 13 are for illustration purpose only. They are not intended to limit the scope of the present invention to only the illustrated user interface sketches or exemplary embodiments. The illustrated user interface in FIGS. 4 to 13 shows button with text description. This is intended for illustration purpose only. In an embodiment, a button or user interaction item can show any text or graphical information (e.g., text, icon, image, picture, symbol, etc.).

Further, the scope of the present invention is not limited to any specific layout (e.g., location of the user interaction item, arrangement of user interaction item, etc.) of the options or format of the user interaction item.

Further, in an embodiment, a client can be programmed to perform the various client process or method hereof described in the figures and respond to user's action. Said program(s) can be stored in storage device attached or integrated with a client (e.g., flash memory, hard drive, CD, DVD, etc.).

Alternatively, a client can be programmed to download or receive the program(s) that perform the various client process or method hereof described in the figures. For instance, in an embodiment, a client can comprise program stored in storage device (e.g., RAM, flash memory, hard drive, CD, DVD, etc.) that is instructed to download program(s) that perform the process or method hereof described in the figures from one or multiple servers.

Figure 14:
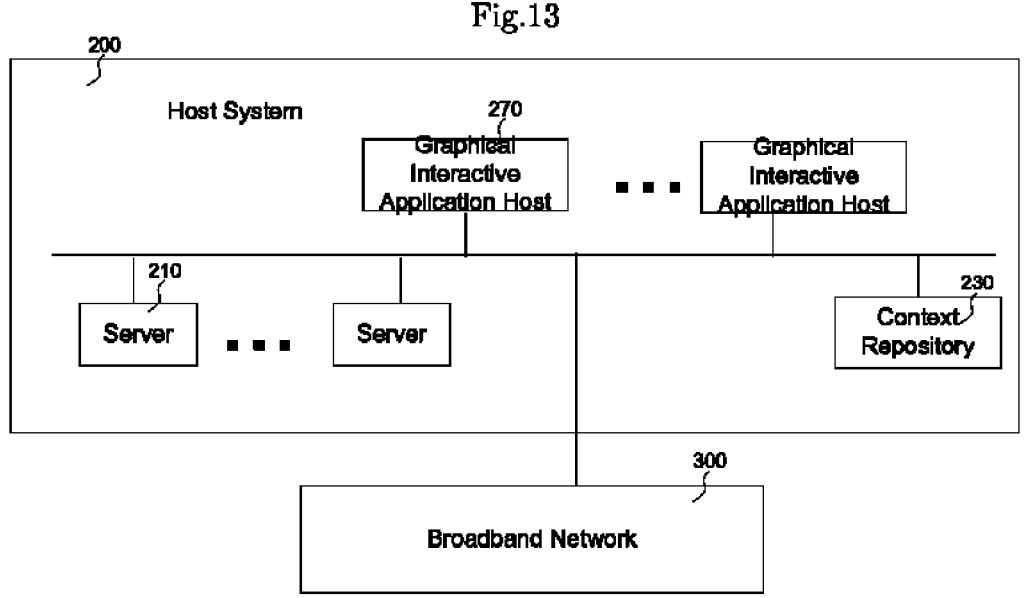
FIG. 14 is a block diagram showing, in one exemplary embodiment, component of a host system that provides graphical interactive application session execution service for client.

FIG. 14 is a block diagram showing, in one embodiment of the present invention, components of a host system (200). In accordance with the present invention, in one embodiment, a host system (200) can run replay session or interactive session of graphical interactive application based on context information stored in one or multiple context repositories (230).

A host system (200) can comprise one or multiple graphical interactive application hosts (270) as execution resources for running replay session or interactive session of graphical interactive applications.

In an embodiment, a graphical interactive application host (270) can comprise one or multiple high performance computer processors, or comprise one or multiple computer processors featuring several processing elements or processor cores in a single chip, so called multi-core or many-core processors.

In an embodiment, a graphical interactive application host (270) can run replay or interactive session of a graphical interactive application in native mode. Alternatively, a graphical interactive application host (270) can run replay or interactive session of a graphical interactive application using virtualization (e.g., virtual machine, emulation).

In one embodiment, a graphical interactive application host (270) can run multiple emulation tasks with each task emulating a console or computer platform. For example, in one embodiment, a graphical interactive application host (270) can run multiple emulators of some commercial game console or operating system.

Furthermore, in each emulated platform or operating system, there can be one or multiple replay or interactive sessions executed.

In an additional embodiment, a graphical interactive application host (270) can run a host operating system. Assume that a graphical interactive application is developed for a platform or operating system different from the host platform or operating system, called target platform or target operating system.

A graphical interactive application host (270) can creates an emulation task or emulation environment that emulates the target platform or the target operating system. Examples of such emulation environment includes but not limited to, Wine Linux, Xen virtualization, console emulator (e.g., playstation2 emulator, gamecube emulator, xbox emulator, etc.), DOS emulator, Microsoft Windows emulator, smartphone emulator, etc.

Similarly, in an embodiment, when replay session or interactive session is created or executed by a client, the client can also run the session either in native mode or using virtualization similar to the approach applied by a graphical interactive application host (270).

Figure 15:
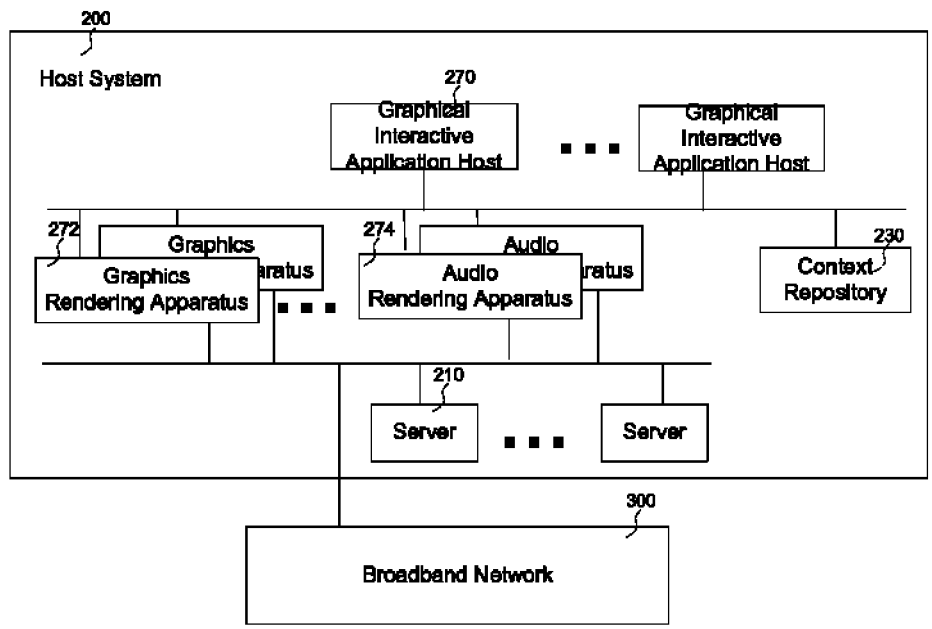
FIG. 15 is a block diagram showing, in one exemplary embodiment, component of a host system that provides graphical interactive application session execution and visual-audio rendering service for client.

FIG. 15 is a block diagram showing, in one exemplary embodiment of the present invention, components of a host system (200) with graphics or audio rendering support. In an embodiment, a host system (200) can comprise one or multiple graphics rendering apparatuses (272) that support rendering of visual output of replay session or interactive session of graphical interactive application.

In addition, a host system (200) can comprise one or multiple audio rendering apparatuses (274) that support rendering of audio output of replay session or interactive session of graphical interactive application.

Further, in an embodiment, said graphics rendering apparatus (272) and audio rendering apparatus (274) can be integrated into one graphics-audio rendering apparatus that supports both visual and audio processing.

In one embodiment, a graphics rendering apparatus (272) comprises one or multiple graphics processing elements. A graphics processing element can render one or multiple streams of visual output for one or multiple graphical interactive application sessions (replay session or interactive session).

A graphics processing element can be a GPU (graphics processing unit) or a DSP (digital signal processor) or a computer micro processor or other similar processing element capable of running graphics processing and rendering.

In an additional embodiment, a graphics rendering apparatus (272) can render or generate frame images concurrently for multiple replay or interactive sessions using time division based resource sharing or using resource multiplexing. Further, in an embodiment, a graphics rendering apparatus (272) can comprise one or multiple video compressors or video encoders.

Still referring to graphics rendering apparatus (272), in an embodiment of a host system (200), a graphics rendering apparatus (272) can connect with graphical interactive application host (270) via inter-connect mechanism. Such inter-connect mechanism includes but not limited to, local bus connectivity (e.g., PCI, PCI-X, PCI-Express, etc.), system-area-network, local area network, local switched network, etc.

It should be understood the scope of the present invention should not be limited to any specific inter-connect setup or inter-connect topology between graphics rendering apparatus and graphical interactive application host. Furthermore, a graphics rendering apparatus (272) can be shared by multiple graphical interactive application hosts (270) or a graphical interactive application host (270) can use multiple graphics rendering apparatuses (272).

In an embodiment, a graphical interactive application host (270) can use any API (application programming interface) capture approach to intercept graphics processing commands and graphics data. For example, two most popular graphics APIs used for developing games are OpenGL and Direct3D. Using API capture, a graphical interactive application host (270) can capture graphics API calls made by a replay or interactive session of a graphical interactive application and the graphics data used by the API calls.

In an alternative embodiment, dummy OpenGL or Direct3D device driver can be used to capture the graphics command or graphics data. Those dummy graphics drivers can export the standard OpenGL or Direct3D or graphics device command interface. After calls to the device driver are captured, they can be sent to one or multiple graphics rendering apparatuses (272) for processing.

In an alternative embodiment, graphics rendering can be carried out by the graphical interactive application host itself (270).

In one embodiment, an audio rendering apparatus can comprise one or multiple control processing elements. Further, an audio rendering apparatus (274) can comprise one or multiple audio processing elements (e.g., DSP, audio processor, audio processing ASIC (application specific integrated circuit), micro processor, etc.).

In addition, an audio rendering apparatus (274) can comprise one or multiple audio data caches. Said audio rendering apparatus (274) can render or synthesize audio for replay session or interactive session of a graphical interactive application.

In an additional embodiment, an audio rendering apparatus (274) can render or synthesize audio concurrently for multiple replay session or interactive sessions using time division based resource sharing or resource multiplexing. Further, in an embodiment, an audio rendering apparatus (274) can comprise one or multiple audio compressors or audio encoders.

Still referring to audio rendering apparatus (274), in an embodiment of a host system (200), an audio rendering apparatus (274) can connect with a graphical interactive application host (270) via inter-connect mechanism. Such inter-connect mechanism includes but not limited to, local bus connectivity (e.g., PCI, PCI-X, PCI-Express, etc.), system-area-network, local area network, local switched network, etc.

It should be understood that the scope of the present invention should not be limited to any specific inter-connect setup or inter-connect topology between audio rendering apparatus and graphical interactive application host.

Furthermore, an audio rendering apparatus can be shared by multiple graphical interactive application hosts or a graphical interactive application host can use multiple audio rendering apparatuses (274).

In one embodiment, a graphical interactive application host (270) can use any audio API capture approach to intercept the audio rendering commands or audio data. For example, one popular audio API used for developing video games is DirectSound. Using API redirection, a graphical interactive application host (270) can capture DirectSound API calls made by a replay session or interactive session of a graphical interactive application and the audio data used by the graphical interactive application.

Alternatively, dummy audio device driver can be used to capture audio command or audio data. The dummy audio driver can export standard audio device interface similar to a real audio driver. After audio rendering commands or audio rendering control parameters or audio data are captured, they are sent to one or multiple audio rendering apparatuses for processing.

In an alternative embodiment, audio rendering can be carried out by graphical interactive application host or itself (270).

Further, in an embodiment, graphics rendering apparatus (272) and audio apparatus (274) can be integrated into one device, graphics-audio rendering apparatus that can render visual-audio output for replay session or interactive session of graphical interactive application executed by one or multiple graphical interactive application hosts (270).

In accordance with the present invention, in one embodiment, replay session or interactive session of graphical interactive application can be executed by one or multiple graphical interactive application hosts (270). A graphical interactive application host (270) can capture the media command (e.g., graphics command, audio command) and/or media data (e.g., graphics data, audio data), and transmit the media command and/or media data to a client wherein the client can render the visual-audio output according to the media command and/or data.

In another embodiment, a host system (200) can render the visual-audio output of a replay session or interactive session of graphical interactive application using graphics and/or audio rendering apparatus. The rendered visual-audio output can be compressed, and streamed to a client. Alternatively, the graphical interactive application host itself can render the visual-audio output.

In another alternative embodiment, a host system (200) can deliver context of replay session or context of interactive session of a graphical interactive application to a client. The client can create a local replay session or interactive session of the graphical interactive application and locally render the visual-audio output of the graphical interactive application.

Figure 16:
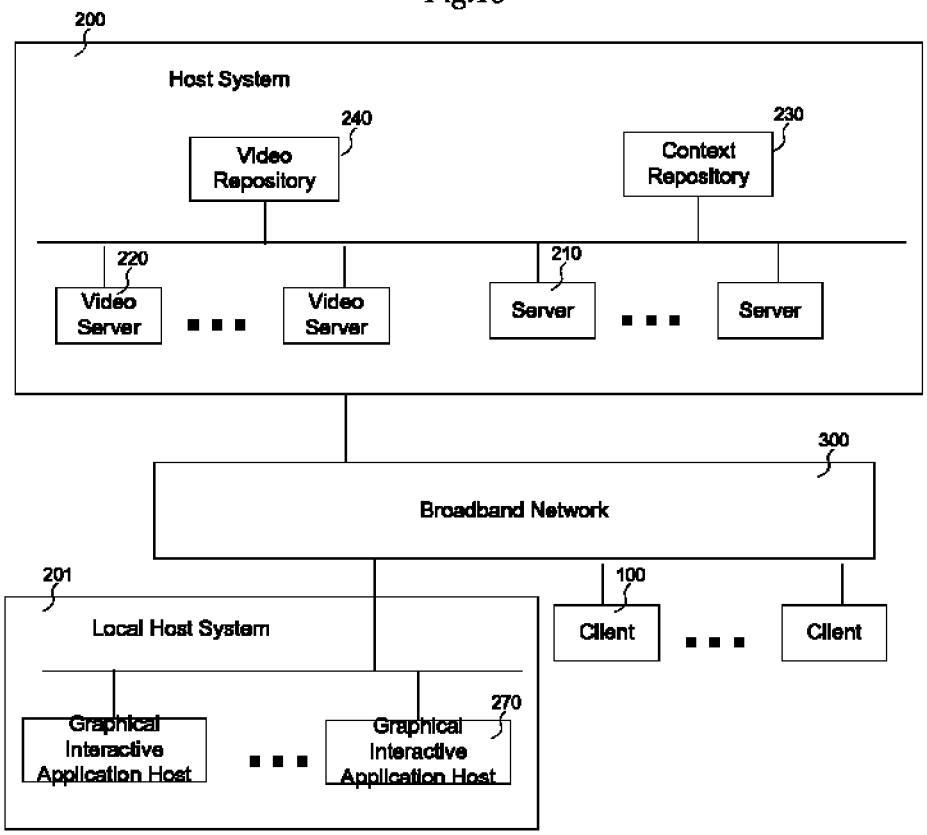
FIG. 16 is a block diagram showing, in one exemplary embodiment, local host system and video/context host system.

FIG. 16 is a block diagram showing, in one embodiment of the present invention, a local host system (201). In accordance with the present invention, in an embodiment, there can be one or a collection of local host systems (201).

In addition, local host systems (201) can be region based wherein a local host system (201) serves a collection of clients (100). Further, the concept of region can be physical, geological, or logical. For instance, in an embodiment, a local host system (201) can be assigned to serve clients with certain domain address(es) or network addresses.

In an alternative embodiment, a local host system (201) can be situated in different physical location or site. For example, there can be a local host system (201) created in a hotel, a school, a local community, a local residential community, etc.

A local host system (201) can comprise one or multiple graphical interactive application hosts (270) that can be used for executing replay session or interactive sessions of graphical interactive applications.

In an additional embodiment, a local host system (201) can render visual-audio output of the executed replay session or interactive sessions, compress the visual-audio output, stream the result to one or a collection of clients.

In an embodiment, a client can retrieve video from a center host system (200) that comprises video and graphical interactive application context repository (230). When the client wants to create an interactive session corresponding to a video, the client (100) can create the interactive session in a local host system (201). Context of the graphical interactive application session can be retrieved from a center host system (200) and delivered to a local host system (201).

An embodiment of the present invention can use any handshake protocol between a local host system (201) and a host system (200) that stores the required graphical interactive application session context and/or the video paired with the context.

In an alternative embodiment, a client can retrieve graphical interactive application session context from a center host system (200) and then request a local host system to create an interactive session using the session context it uploads to the local host system (201).

Figure 17:
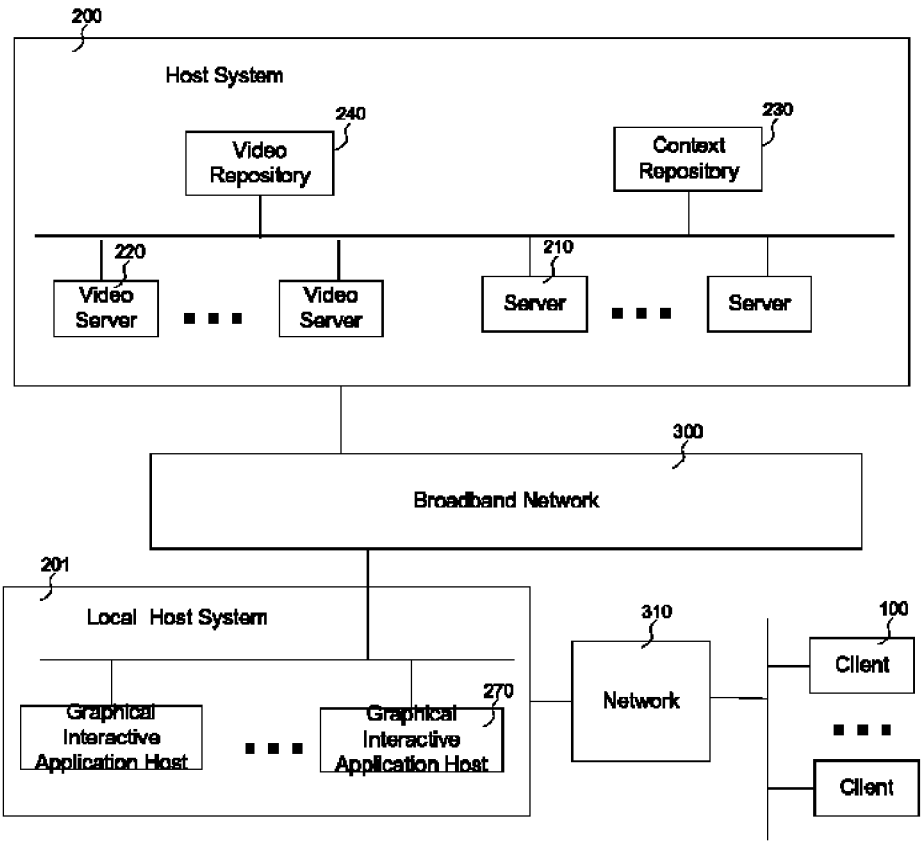
FIG. 17 is a block diagram showing, in one exemplary embodiment, local host system that provides service for clients connected with regional network.

FIG. 17 is a block diagram showing, in one exemplary embodiment of the present invention, a local host system (201). In accordance with the present invention, in an embodiment, a local host system (201) can connect with a regional network (310). One or multiple clients (100) can receive service from a local host system via a regional network (310). Such regional network (310) includes but not limited to, local area network, local wireless area network, or any other regional high bandwidth network.

Figure 18:
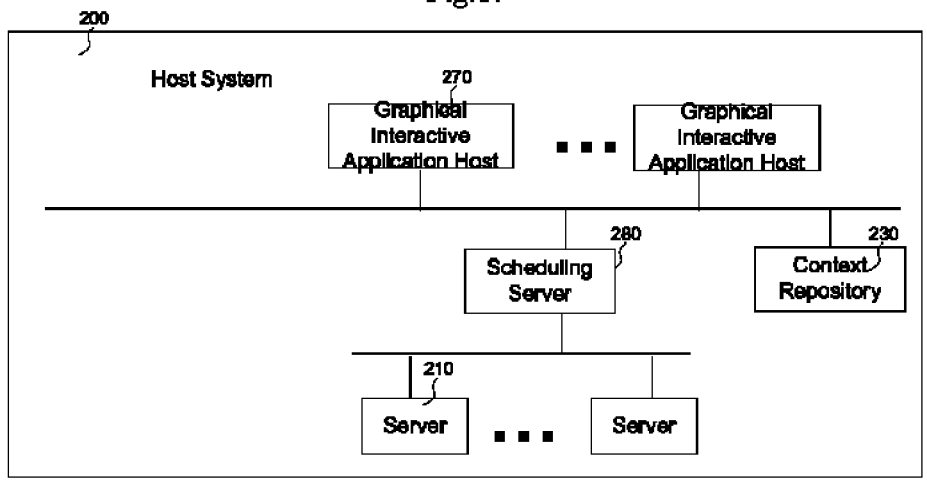
FIG. 18 is a block diagram showing, in one exemplary embodiment, scheduling server of a host system that schedules graphical interactive application sessions.

FIG. 18 is a block diagram showing, in one embodiment of the present invention, components of a host system (200) with graphical interactive application session scheduling support. In an embodiment, a host system (200) can comprise one or multiple scheduling servers (280) that schedule task of replay session or interactive session to one or multiple graphical interactive application hosts (270).

In additional embodiment, a scheduling server can distribute the tasks of replay session or interactive session in a load balancing way to a collection of graphical interactive application hosts (270). For instance, a scheduling server (280) can allocate new tasks to graphical interactive application host (270) with less assigned workload, or allocate new tasks to graphical interactive application host (270) with more available resources (e.g., available processing power, available cpu time, available memory resources, etc.).

Figure 19:
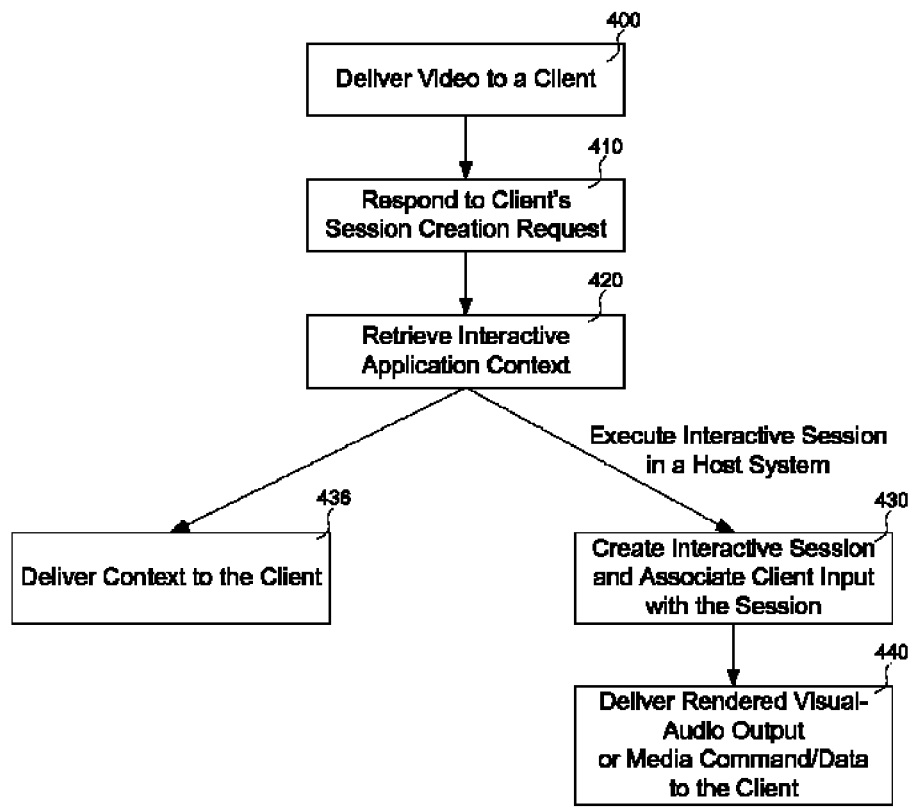
FIG. 19 is a flowchart showing, in one exemplary embodiment, process handling graphical interactive application session creation from video by a host system.

FIG. 19 is a flow chart showing, in one exemplary embodiment of the present invention, process of creating an interactive session of a graphical interactive application based on a video.

In an embodiment, a host system can transmit one or multiple pieces of video to a client (400). The video may be requested by a client. Or alternatively, a host system can push the video to a client. A client can request to start an interactive session of a graphical interactive application that is paired with the video or associated with a frame moment of the video. As response, a host system can retrieve the corresponding context of the graphical interactive application from a context repository (410 and 420).

Further, the host system can start an interactive session based on the retrieved context and associate interactive input from the client with the interactive session (430).

In an embodiment, one or multiple graphical interactive application hosts can be allocated to run an interactive session. When an interactive session is executed, the host system can render its visual-audio output and stream the compressed visual-audio output to the client (440).

Or alternatively, the host system can transmit media command and/or media data of the interactive session to the client and have the client render the visual-audio output according to the media command and/or data (440).

Or the host system may deliver the context to the client where the client can create a local interactive session based on the context (436)

As various changes can be made in the above embodiments and operating methods without departing from the spirit or scope of the following claims, it is intended that all matter contained in the above description or shown in the accompanying drawings should be interpreted as illustrative and not in a limiting sense. The invention is not limited by the specific embodiments described herein. Variations or modifications to the design and construction of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention.

What is claimed is:

1. A method of creating interactive session of a graphical interactive application based on video delivered from a host system wherein frame moments of the video are paired with contexts of said graphical interactive application, said method comprising,
    displaying at least one video by a client wherein said client comprises at least one network communication interface, control processing element, and at least one video interface and the video is delivered over networks from a host system or created by the client from a replay session of a graphical interactive application;
    allowing user of the client to select a frame moment of the video and creating an interactive session of the graphical interactive application using a context paired with the frame moment of the video; and
    starting and running the graphical interactive application using the context paired with the frame moment, and generating visual-audio output of the graphical interactive application.

2. The method in claim 1, wherein delivering video to a client by a host system, further comprising,
    creating a replay session by the host system using a replay context retrieved from a context repository;
    starting and running the graphical interactive application using said replay context, and generating visual-audio output of the graphical interactive application; and
    delivering visual-audio output of the replay session to the client by the host system.

3. The method in claim 1, wherein a video is displayed, further comprising, displaying video generated from a local replay session of a graphical interactive application, wherein said replay session is created using a replay context downloaded to the client from the host system, and the video is generated by running the graphical interactive application using said downloaded context.

4. The method in claim 1, wherein a video is displayed, further comprising,
    creating a replay session by the host system using a replay context retrieved from a context repository;
    starting and running the graphical interactive application using said replay context;
    delivering media command and/or media data of the replay session to the client by the host system; and
    rendering visual-audio output by the client according to the media command and/or media data received by the client from the host system.

5. The method in claim 1, wherein a client creates an interactive session based on a frame moment of the displayed video, further comprising, starting the interactive session using a context of the graphical interactive application wherein said context to the beginning of the displayed video.

6. The method in claim 1, wherein a client creates an interactive session based on a frame moment of the displayed video, further comprising, starting the interactive session using a context of the graphical interactive application wherein said context corresponds to the ending of the displayed video.

7. The method in claim 1, wherein a client creates an interactive session based on video, further comprising, starting the interactive session using a context of the graphical interactive application wherein said context to a frame moment of the displayed video.

8. The method in claim 1, wherein creating an interactive session of a graphical interactive application by a host system in response to a client, further comprising,
    running said graphical interactive application using a selected context by the host system wherein the graphical interactive application is under control of user input sent from the client; and
    rendering visual-audio output of the graphical interactive application and delivering compressed and/or encoded visual-audio output to the client over networks.

9. The method in claim 1,
    wherein creating an interactive session of a graphical interactive application by a host system in response to a client, further comprising,
    running said graphical interactive application using a selected context by the host system wherein the graphical interactive application is under control of user input sent from the client;
    sending media rendering command or media data of the graphical interactive application to the client; and
    rendering visual-audio output of the interactive session by the client in accordance with the media command or media data.

10. The method in claim 1, wherein the client requests to create an interactive session, further comprising,
    retrieving a context of the graphical interactive application wherein said context is paired with the selected frame moment of the displayed video from a host system and downloading said context to the client; and
    starting and running the graphical interactive application using said context by the client.

11. The method in claim 1, further comprising,
    when the displayed video is generated based on a replay session of a graphical interactive application, and a frame moment is selected, converting said replay session into an interactive session by running the graphical interactive application using the replay context paired with the replay session, and associating user input received by the client with the executed graphical interactive application.

12. The method in claim 1, wherein an interactive session is created using a context and the graphical interactive application is executed, further comprising, running the graphical interactive application using a saved application state wherein said saved application state is paired with a frame moment of the displayed video.

13. The method in claim 1, wherein an interactive session is created using a context and the graphical interactive application is executed, further comprising, running the graphical interactive application using a checkpoint state wherein said checkpoint state is paired with a frame moment of the displayed video.

14. The method in claim 1, wherein the graphical interactive application is executed using a context, further comprising, executing the graphical interactive application using an emulator.

15. The method in claim 1, wherein the graphical interactive application is executed using a context, further comprising, executing the graphical interactive application using a virtual machine.

* * * * *